United States Patent
Wang et al.

(10) Patent No.: US 10,288,932 B2
(45) Date of Patent: May 14, 2019

(54) DISPLAY DEVICE

(71) Applicant: AU Optronics Corporation, Hsin-Chu (TW)

(72) Inventors: Wei-Shyang Wang, Hsin-Chu (TW); Iou-Jou Wu, Hsin-Chu (TW); Yu-Lin Huang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/943,876

(22) Filed: Apr. 3, 2018

(65) Prior Publication Data
US 2018/0356681 A1 Dec. 13, 2018

(30) Foreign Application Priority Data

Jun. 13, 2017 (TW) .............................. 106119693 A (51) Int. Cl.
  *G02F 1/1335* (2006.01)
  *F21V 8/00* (2006.01)
  *G02F 1/1333* (2006.01)

(52) U.S. Cl.
  CPC ..... *G02F 1/133528* (2013.01); *G02B 6/0025* (2013.01); *G02F 1/133308* (2013.01); *G02F 1/133602* (2013.01)

(58) Field of Classification Search
  CPC ................................................ G02F 1/133528
  See application file for complete search history.

(56) References Cited

U.S. PATENT DOCUMENTS

| 8,289,470 | B2 | 10/2012 | Chen et al. |
| 8,641,261 | B2 | 2/2014 | Cheng et al. |
| 8,905,563 | B2 | 12/2014 | Wu et al. |
| 2010/0053499 | A1* | 3/2010 | Sasaki ............... G02F 1/133308 349/62 |
| 2014/0240641 | A1* | 8/2014 | Kang ................ G02F 1/133308 349/62 |
| 2015/0036074 | A1* | 2/2015 | Park ........................ G02B 5/30 349/58 |

FOREIGN PATENT DOCUMENTS

| CN | 101995701 A | 3/2011 |
| CN | 102608779 A | 7/2012 |
| JP | 2008170584 | 7/2008 |
| JP | 2009076293 | 4/2009 |
| TW | M399339 | 3/2011 |

* cited by examiner

*Primary Examiner* — Edmond C Lau
(74) *Attorney, Agent, or Firm* — WPAT, PC (57) ABSTRACT

A display device includes a display panel having a first surface with a first side, a second surface parallel and opposite to the first surface and having a second side opposite to the first side, and an end surface connecting the first side and the second side, a first polarizer disposed on the first surface, and a second polarizer disposed on the second surface. The first polarizer and the second polarizer respectively protrude from the first side and the second side and are bent oppositely to form a first bent portion and a second bent portion; and the first bent portion and the second bent portion at least partially overlap, and the overlapping portion at least partially covers the end surface.

8 Claims, 7 Drawing Sheets

DISPLAY DEVICE

BACKGROUND

Technical Field

The present invention generally relates to a display device, and specifically, the present invention relates to a display device whose polarizers are bent oppositely.

Related Art

In a conventional display device, a display panel is usually fastened to a backlight module by using a double-sided tape, and a black sealant is coated on the edge of the panel, to prevent collision damage and light leakage. However, when the double-sided tape is used to fasten the display panel, reworking is not easy, and fragments and remnant glue are easily caused. Besides, because the edge of the display panel is fastened by using the black sealant, a weak part in the middle structure of the panel is easily arched and deformed during thermal expansion of the panel, affecting display quality. In addition, when the black sealant is coated on the edge of the display panel, a coating process is added and the black sealant easily falls off.

SUMMARY

An objective of the present invention is to provide a display device, in which upper and lower polarizers are bent oppositely to fasten a display panel, so that flexibility of a design free of a front frame or even a whole frame is improved, and the display panel can expand thermally and is not easily arched and deformed.

Another objective of the present invention is to provide a display device, in which upper and lower polarizers are bent oppositely and overlap to reduce a light leakage probability, a black sealant does not need to be used so that a coating process is avoided, and reworking feasibility is improved.

In an embodiment, the present invention provides a display device, including: a display panel, a first polarizer, and a second polarizer. The display panel has a first surface, a second surface, and an end surface. The first surface has a first side; the second surface is parallel and opposite to the first surface, and has a second side opposite to the first side; and the end surface is connected to the first side and the second side. The first polarizer is disposed on the first surface. The second polarizer is disposed on the second surface. The first polarizer and the second polarizer respectively protrude from the first side and the second side and are bent oppositely to form a first bent portion and a second bent portion; and the first bent portion and the second bent portion at least partially overlap, and the overlapping portion at least partially covers the end surface.

In an embodiment, the first bent portion has a first polarization axis direction, the second bent portion has a second polarization axis direction, and the first polarization axis direction and the second polarization axis direction are perpendicular to each other.

In an embodiment, the first polarizer and the second polarizer are circular polarizers, one of the first polarizer and the second polarizer is of clockwise circular polarizer, one of the first polarizer and the second polarizer is a clockwise circular polarizer, and the other of the first polarizer and the second polarizer is a counter-clockwise circular polarizerrizer.

The display device of the present invention further includes a support frame to support a location of the second polarizer close to the second side. A part of the first bent portion extends beyond the second bent portion to partially cover the support frame.

In an embodiment, the first bent portion is connected to the support frame, and tension on the first bent portion is greater than tension on the second bent portion.

In an embodiment, a slot is formed on the support frame, and the part of the first bent portion beyond the second bent portion partially extends into the slot.

In an embodiment, the display device of the present invention further includes an outer frame. The outer frame at least partially covers the part of the first bent portion which is partially covering the support frame.

In an embodiment, the second bent portion is partially located between the first bent portion and the end surface, and the second bent portion is bent along the first side to partially cover the first surface.

REFERENCE NUMERALS

134: third bent portion;
140 and 140': support frame;
142: slot;
150: backlight module;
152: light guide plate;
154: light source;
156: optical film;
160: back frame; and
170: outer frame.

DETAILED DESCRIPTION

Figure 1A:
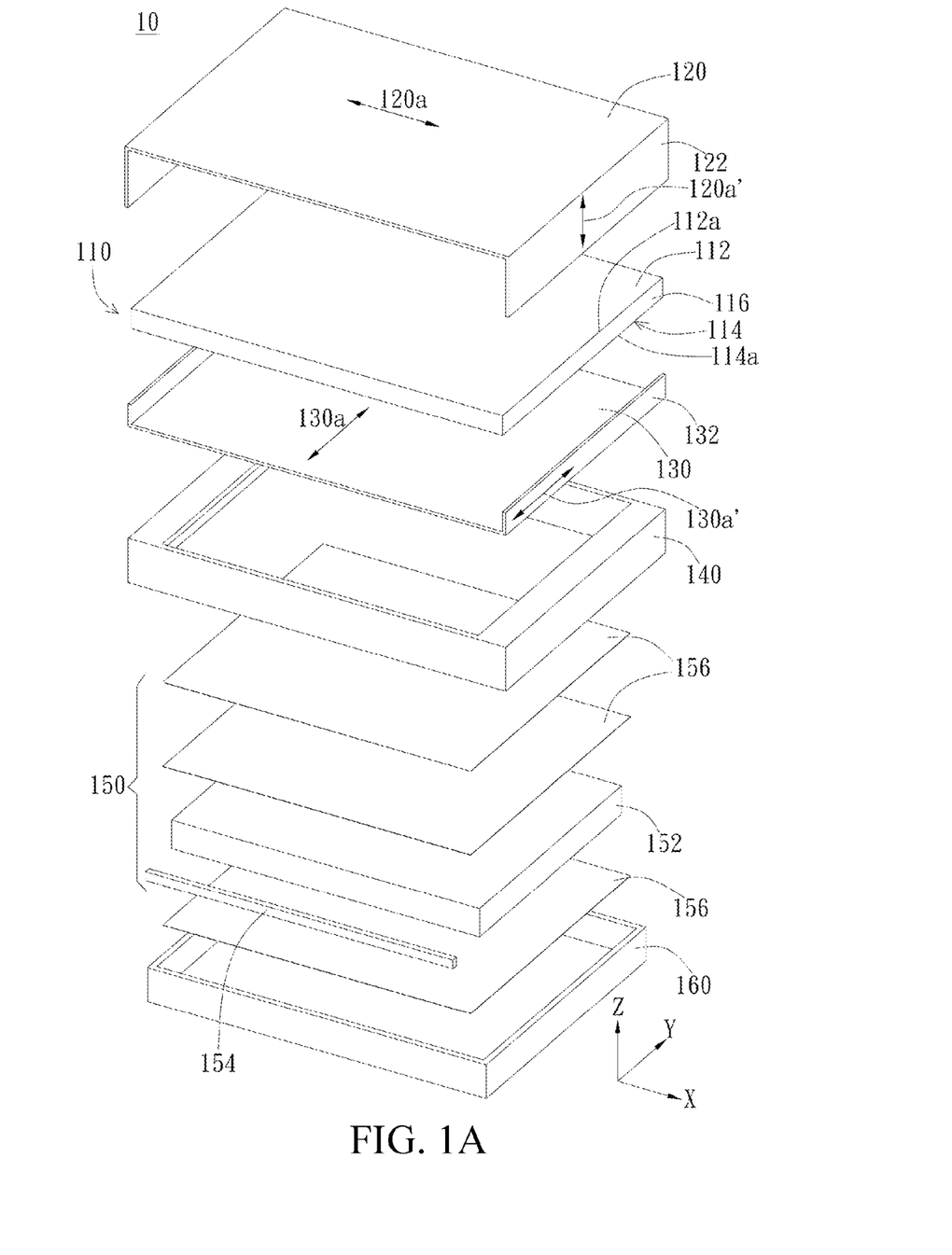
FIG. 1A is a schematic explosive view of a display device according to an embodiment of the present invention.
Figure 1B:
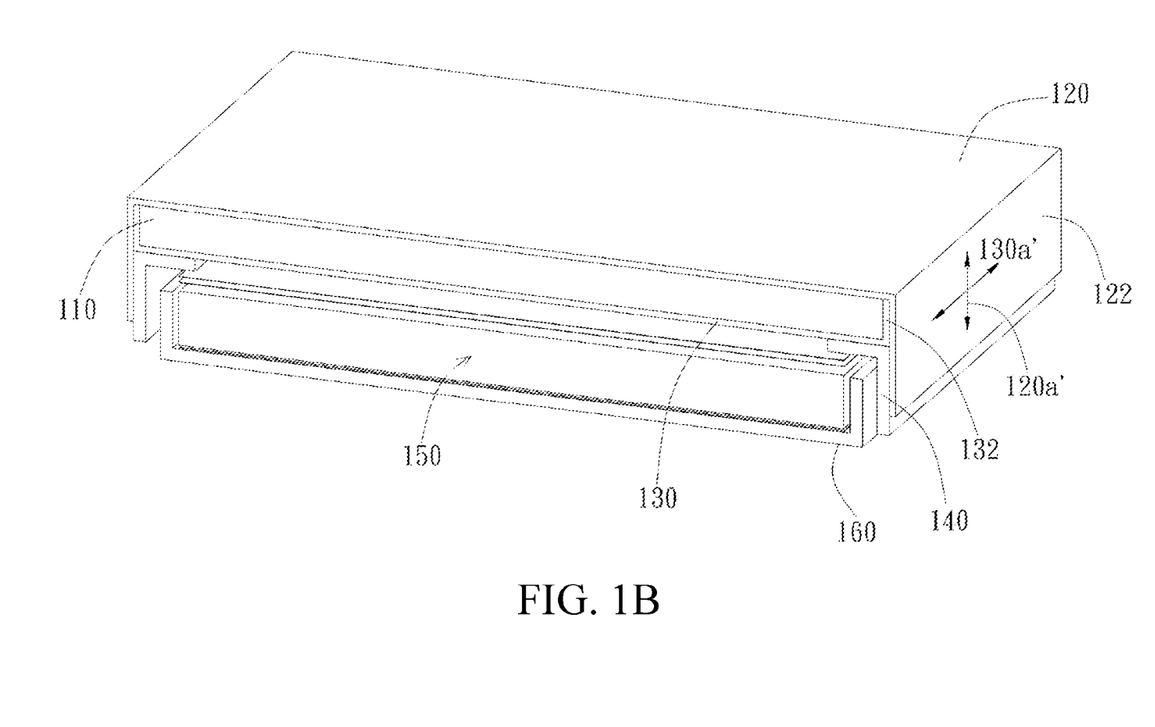
FIG. 1B is a schematic partial three-dimensional view of the display device in FIG. 1A.
Figure 1C:
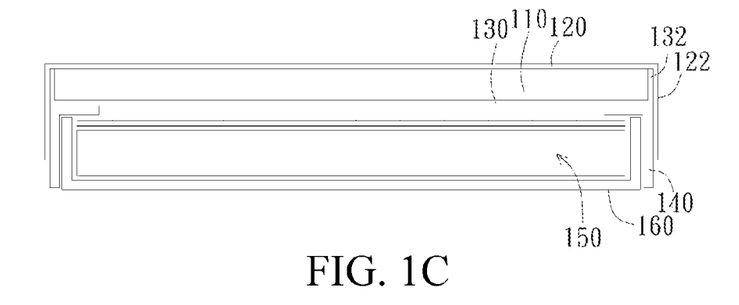
FIG. 1C is a schematic sectional view of the display device in FIG. 1A.
Figure 1D:
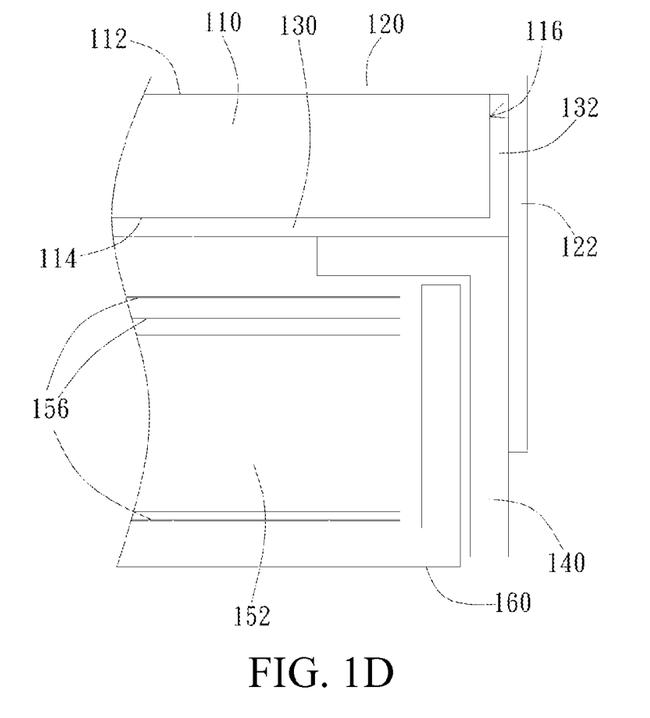
FIG. 1D is an enlarged partial view of FIG. 1C.

The present invention provides a display device, in which an upper polarizer and a lower polarizer are bent oppositely on an end surface on a side of a display panel, to achieve effects of fastening, preventing light leakage, and simplifying a process. Referring to FIG. 1A to FIG. 1D, FIG. 1A is a schematic explosive view of a display device according to an embodiment of the present invention, FIG. 1B is a schematic partial three-dimensional view of the display device in FIG. 1A, FIG. 1C is a schematic sectional view of the display device in FIG. 1A; and FIG. 1D is an enlarged partial view of FIG. 1C. As shown in FIG. 1A to FIG. 1D, the display device 10 includes a display panel 110, a first polarizer 120, and a second polarizer 130. The display panel 110 has a first surface 112, a second surface 114, and an end surface 116. The first surface 112 has a first side 112a; the second surface 114 is parallel and opposite to the first surface 112, and has a second side 114a opposite to the first side 112a; and the end surface 116 is connected to the first side 112a and the second side 114a. For example, the display panel 110 may be a liquid crystal display panel, and formed by sandwiching a liquid crystal layer between two substrates, but the present invention is not limited thereto. In another embodiment, the display panel 110 may be an organic light-emitting display panel, an electrophoretic display panel, a liquid powder display panel, an electrowetting display panel, or the like. In this embodiment, the display panel 110 is preferably substantially rectangular, but the present invention is not limited thereto.

The first surface 112 and the second surface 114 of the display panel 110 are two opposite surfaces of the display panel 110, and a normal line direction of the first surface 112 and the second surface 114 is preferably parallel to a thickness direction (that is, a Z axis direction) of the display panel 110. For example, the first surface 112 and the second surface 114 are surfaces extending along an XY plane, and are correspondingly arranged in parallel along the Z axis direction. The first side 112a of the first surface 112 and the second side 114a of the second surface 114 are located on a same side of the display panel 110, and located oppositely in the thickness direction of the display panel 110. For example, the first side 112a and the second side 114a extend along a Y axis direction, and are correspondingly arranged in parallel along the Z axis direction. The end surface 116 is connected to the first side 112a and the second side 114a, so that the end surface 116 is a side surface connecting the first surface 112 and the second surface 114. In other words, a normal line direction of the end surface 116 is preferably perpendicular to the thickness direction of the display panel 110, and the first side 112a and the second side 114a are two sides of the end surface 116 in the thickness direction. For example, the end surface 116 extends along a YZ plane, and the first side 112a and the second side 114a are also two sides of the end surface 116 that extend along the Y axis direction. In other words, using a rectangular display panel 110 as an example, the display panel 110 may have four sides, which respectively having four side surfaces connecting the first surface 112 and the second surface 114, and the end surface 116 is one of the four side surfaces of the display panel 110, and is connected between the first surface 112 and the second surface 114. For ease of description, this embodiment is described by using a surface on one side. In addition, the end surface 116 mentioned in this embodiment may be not a single plane (that is, may be a plurality of surfaces). For example, the end surface 116 is formed by side surfaces of upper and lower substrates of the display panel 110, and the side surfaces of the upper and lower substrates are not cut aligned and are in a shape of a stair.

The first polarizer 120 is disposed on the first surface 112, and the second polarizer 130 is disposed on the second surface 114. The first polarizer 120 and the second polarizer 130 respectively protrude from the first side 112a and the second side 114a, and are bent oppositely to form a first bent portion 122 and a second bent portion 132. The first bent portion 122 and the second bent portion 132 at least partially overlap, and the overlapping portion at least partially covers the end surface 116. For example, the first polarizer 120 and the second polarizer 130 extend along the XY plane and are respectively disposed on opposite sides of the display panel 110 in the Z axis direction, to substantially respectively cover the first surface 112 and the second surface 114. The first polarizer 120 and the second polarizer 130 are preferably longer than the display panel 110 in the X axis direction, so that two sides of the first polarizer 120 respectively protrude from two opposite sides of the display panel 110 in the X axis direction (that is, the first side 112a and a side opposite thereto, and two sides of the second polarizer 130 also respectively protrude from two opposite sides of the display panel 110 in the X axis direction (that is, the second side 114a and a side opposite thereto). The part of the first polarizer 120 beyond the first side 112a is bent towards the second polarizer 130 along the first side 112a to form the first bent portion 122, and the part of the second polarizer 130 beyond the second side 114a is bent towards the first polarizer 120 along the second side 114a to form the second bent portion 132. For example, the first bent portion 122 and the second bent portion 132 that are formed by bending the first polarizer 120 and the second polarizer 130 extend along the YZ plane and at least partially overlap, and the overlapping portion between the first bent portion 122 and the second bent portion 132 at least partially covers the end surface 116.

The first polarizer 120 has a first polarization axis direction 120a, and the second polarizer 130 has a second polarization axis direction 130a, so that after entering the display panel 110 from the second polarizer 130, light is selectively blocked by the first polarizer 120 or output from the first polarizer 120. In an embodiment, the first polarization axis direction 120a and the second polarization axis direction 130a are preferably perpendicular to each other. For example, the first polarization axis direction 120a of the first polarizer 120 is preferably parallel to the X axis direction (for example, perpendicular to the first side 112a), and the second polarization axis direction 130a of the second polarizer 130 is preferably parallel to the Y axis direction (for example, parallel to the second side 114a). Therefore, after light enters the display panel 110 from the second polarizer 130, when a rotation direction of liquid crystal molecules in the liquid crystal layer is controlled so that a polarization direction of the light rotates, the light may be output from the first polarizer 120. After light enters the display panel 110 from the second polarizer 130, when the control liquid crystal layer is controlled so that a polarization direction of the light does not rotate, the light may be blocked by the first polarizer 120.

In this embodiment, before the first polarizer 120 is bent, the first polarization axis direction 120a of the part protruding from the first side 112a is parallel to the X axis direction. After the first polarizer 120 is bent towards the Z axis direction (downwards) along the Y axis direction to form the first bent portion 122, a first polarization axis direction 120a' of the first bent portion 122 is parallel to the Z axis direction. Before the second polarizer 130 is bent, the second polarization axis direction 130a of the part protruding from the second side 114a is parallel to the Y axis direction. After the second polarizer 130 is bent towards the Z axis direction (upwards) along the Y axis direction to form the second bent portion 132, a second polarization axis direction 130a' of the second bent portion 132 is also parallel to the Y axis direction, so that the first polarization axis direction 120a' of the first bent portion 122 and the second polarization axis direction 130a' of the second bent portion 132 are perpendicular to each other. Therefore, the overlap portion between the first bent portion 122 and the second bent portion 132 covers the end surface 116, and can prevent light from being leaked from a covered overlap part of the end surface 116.

It should be noted herein that, although it is shown in the foregoing embodiment that the first polarizer 120 and the second polarizer 130 are linear polarizers, so that the first polarization axis direction 120a of the first polarizer 120 and the second polarization axis direction 130a of the second polarizer 130 are perpendicular to each other and are respectively perpendicular to the extension direction of the first side 112a and parallel to the extension direction of the second side 114a, the present invention is not limited thereto. In another embodiment, the first polarizer 120 and the second polarizer 130 may be circular polarizers, one of the first polarizer 120 and the second polarizer 130 is of clockwise circular polarizer, and the other of the first polarizer 120 and the second polarizer 130 is of counter-clockwise circular polarizer. After the first polarizer 120 and the second polarizer 130 are respectively bent along the first side 112a and the second side 114a oppositely, polarization directions of the first bent portion 122 and the second bent portion 132 are still reverse, so that the overlap portion between the first bent portion 122 and the second bent portion 132 covers the end surface 116, and can prevent light from being leaked from the covered overlap part of the end surface 116.

In addition, as shown in FIG. 1A to FIG. 1D, the display device 10 may further include a support frame 140, a backlight module 150, and a back frame 160. The backlight module 150 is disposed in the back frame 160. The support frame 140 supports the second polarizer 130 to get close to a location of the second side 114a, and is disposed around the back frame 160. For example, the back frame 160 has an accommodating space for disposing the backlight module 150. The backlight module 150 may include a light guide plate 152, a light source 154, and a plurality of optical films 156. The light source 154 is, for example, a light-emitting diode (but the present invention is not limited thereto), and emits light to the light guide plate 152. The light guide plate 152 guides the light to output the light to the second polarizer 130. The plurality of optical films 156 is selectively disposed above and/or below the light guide plate 152, to enhance an optical effect. The plurality of optical films 156 may include, for example, but not limited to: a brightness enhancement film, a diffuser film, and a reflective film. The support frame 140 is in a frame structure corresponding to the back frame 160, and is disposed below the display panel 110 and around an outer side of the back frame 160, to support the second polarizer 130 and the display panel 110. For example, the support frame 140 may have an inverted L-shaped section, a horizontal part supports the second polarizer 130 and the display panel 110, and a vertical part is located on the outer side of the back frame 160. When the support frame 140 is below and supports the second polarizer 130, the first bent portion 122 preferably extends beyond the second bent portion 132 to partially cover the support frame 140. In other words, a length of the first bent portion 122 is preferably greater than a total thickness of the display panel 110 and the second polarizer 130, so that the second bent portion 132 is located between the end surface 116 and the first bent portion 122, and the first bent portion 122 at least partially overlaps the vertical part (that is, a side surface) of the support frame 140. Therefore, a back adhesive on the first polarizer 120 may be used to connect (for example, adhere) to the side surface of the support frame 140, so that tension of the first bent portion 122 is greater than tension of the second bent portion 132, and the display panel 110 is fastened more tightly. That is, the first bent portion 122 of the first polarizer 120 that is bent downwards is connected to the support frame 140, so that a downward normal force may be produced, friction between the second polarizer 130 and an upper surface of the support frame 140 increases, and the display panel 110 is fastened more tightly.

Figure 2A:
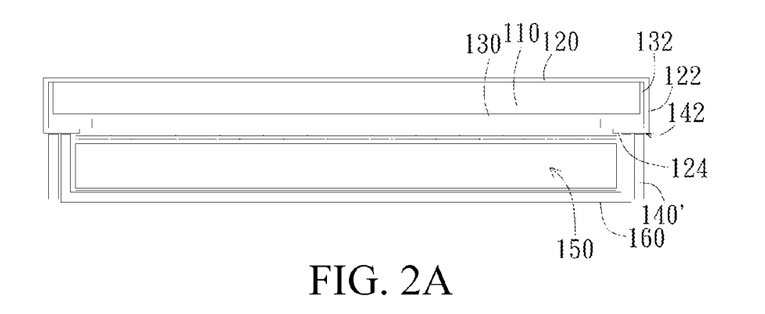
FIG. 2A and FIG. 2B are respectively a schematic sectional view and an enlarged partial view of a display device according to another embodiment of the present invention.
Figure 2B:
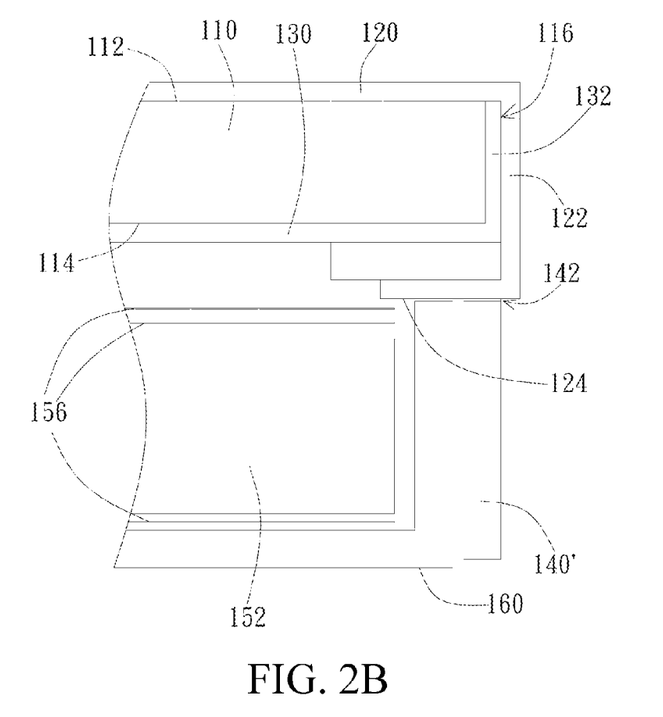

Although it is shown in the foregoing embodiment that the first bent portion 122 is connected to the side surface of the support frame 140, the present invention is not limited thereto. Referring to FIG. 2A and FIG. 2B, FIG. 2A is a schematic sectional view of a display device according to another embodiment of the present invention, and FIG. 2B is an enlarged partial view of FIG. 2A. As shown in FIG. 2A and FIG. 2B, a slot 142 is formed on a support frame 140', and the part of the first bent portion 122 beyond the second bent portion 132 partially extends into the slot 142. For example, the slot 142 corresponding to the first bent portion 122 may be opened on a vertical part of the support frame 140' along the Y axis direction, and a tail part 124 of the first bent portion 122 is inserted into the corresponding slot 142, to enhance a fastening effect. A location of the slot 142 is preferably close to and below a horizontal part of the support frame 140' that supports the second polarizer 130, so that after being inserted into the slot 142, the tail part 124 of the first bent portion 122 may be attached to a lower surface of the horizontal part of the support frame 140' by using the back adhesive.

Figure 3A:
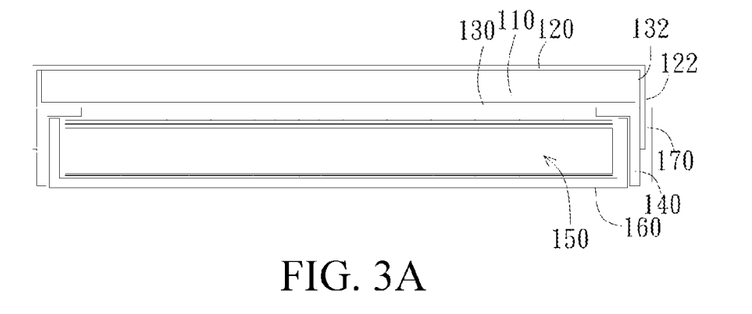
FIG. 3A and FIG. 3B are respectively a schematic sectional view and an enlarged partial view of a display device according to another embodiment of the present invention.
Figure 3B:
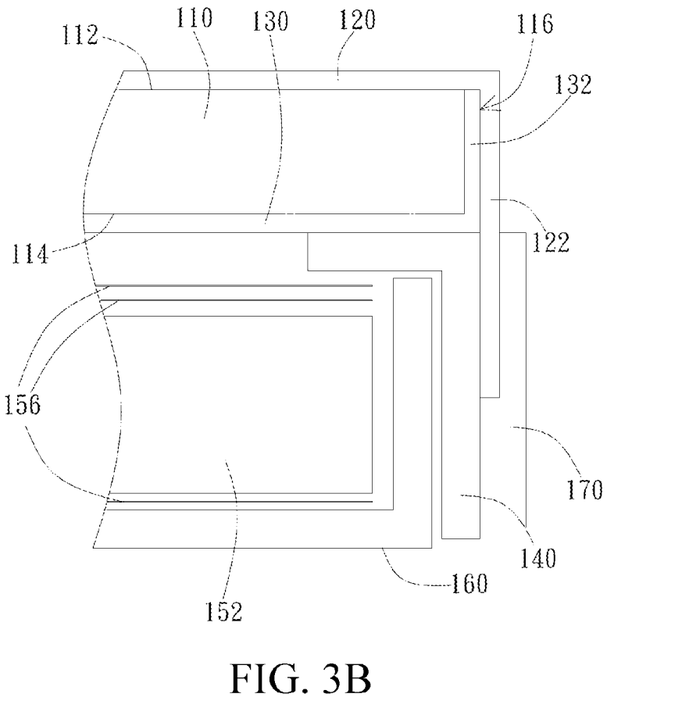

Referring to FIG. 3A and FIG. 3B, FIG. 3A is a schematic sectional view of a display device according to another embodiment of the present invention, and FIG. 3B is an enlarged partial view of FIG. 3A. As shown in FIG. 3A and FIG. 3B, the display device may further include an outer frame 170, and the outer frame 170 at least partially covers the part of the support frame 140 that is covered by the first bent portion 122. For example, the outer frame 170 may be a system frame or a decoration frame (or a decoration sheet) of the display device, and the outer frame 170 preferably covers at least the downward part of the first bent portion 122 beyond the second polarizer 130, to improve the overall appearance and structural strength of the display device. It should be noted that, the outer frame 170 shown in FIG. 3A may also be applied to the embodiments shown in FIG. 2A and FIG. 4A and FIG. 5A below, and details are not described below again.

Figure 4A:
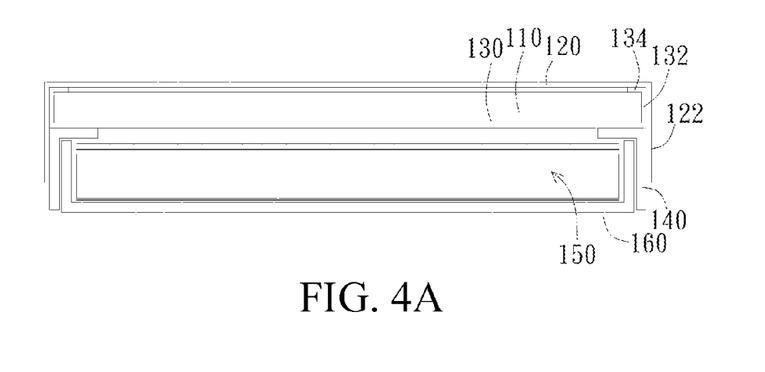
FIG. 4A and FIG. 4B are respectively a schematic sectional view and an enlarged partial view of a display device according to another embodiment of the present invention.
Figure 4B:
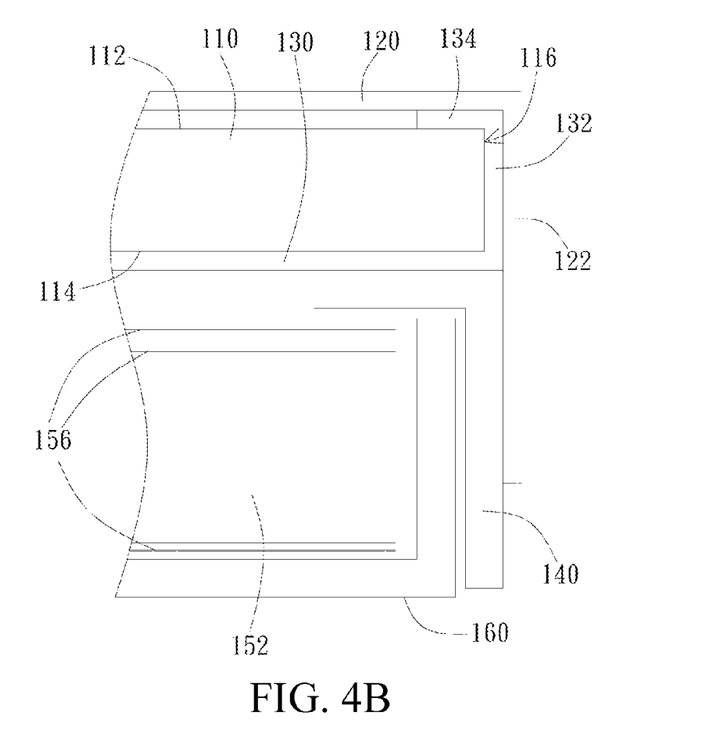

Referring to FIG. 4A and FIG. 4B, FIG. 4A is a schematic sectional view of a display device according to another embodiment of the present invention, and FIG. 4B is an enlarged partial view of FIG. 4A. As shown in FIG. 4A and FIG. 4B, the second bent portion 132 of the second polarizer 130 is partially located between the first bent portion 122 and the end surface 116, and the second bent portion 132 is bent along the first side 112a to partially cover the first surface 112. For example, an extension length of the second bent portion 132 is preferably greater than a thickness of the display panel 110, so that the second bent portion 132 protrudes from the first side 112a and is bent along the first side 112a to form a third bent portion 134. The third bent portion 134 is parallel to and covers the first surface 112, and may be attached to the first surface 112 by using the back adhesive on the second polarizer 130, so that the display panel 110 is fastened more tightly.

Figure 5A:
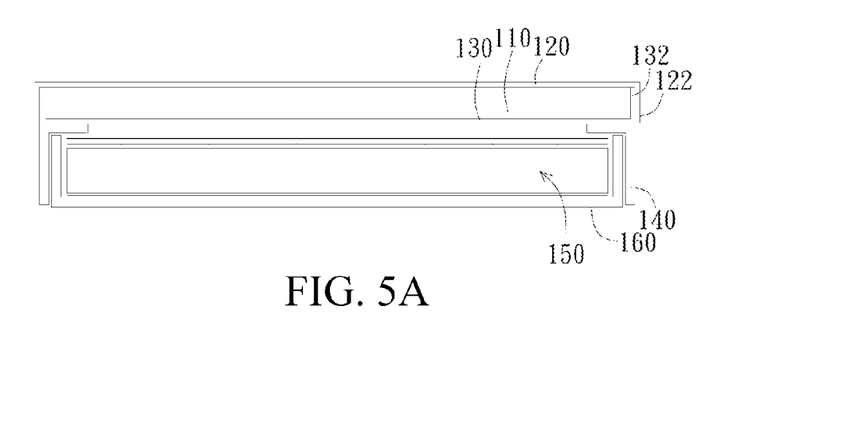
FIG. 5A and FIG. 5B are respectively a schematic sectional view and an enlarged partial view of a display device according to another embodiment of the present invention.
Figure 5B:
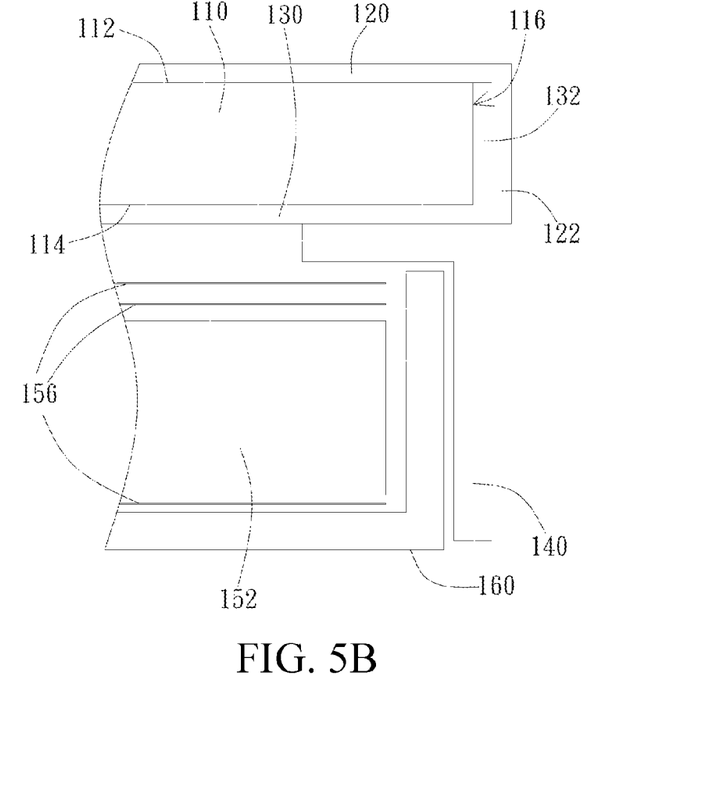

It should be noted herein that, although it is shown in the foregoing embodiments that the first bent portion 122 of the first polarizer 120 preferably extends beyond the second polarizer 130 to connect to the support frame 140 (or 140'), the present invention is not limited thereto. Referring to FIG. 5A and FIG. 5B, FIG. 5A is a schematic sectional view of a display device according to another embodiment of the present invention, and FIG. 5B is an enlarged partial view of FIG. 5A. As shown in FIG. 5A and FIG. 5B, the extension length of the first bent portion 122 may be substantially equal to the thickness of the display panel 110 or the total thickness of the display panel 110 and the second polarizer 130, so that the second bent portion 132 is located between the end surface 116 and the first bent portion 122, and the first bent portion 122 is adhered to the second bent portion 132 by using the back adhesive, and is connected to the support frame 140 by using the second polarizer 130, thereby achieving effects of fastening the display panel 110 and preventing light leakage. Alternatively (not shown), the first bent portion 122 may be located between the end surface 116 and the second bent portion 132, the second bent portion 132 is adhered to the first bent portion 122 by using the back adhesive, the second polarizer 130 is connected to the support frame 140, and the second bent portion 132 is connected to the support frame 140 by using the second polarizer 130, thereby achieving effects of fastening the display panel 110 and preventing light leakage.

In addition, although the embodiments in FIG. 1A to FIG. 5B are described by using an end surface on one side of the display panel, in another embodiment, the size and design of the first polarizer and the second polarizer may be changed, so that end surfaces on multiple sides (for example, end surfaces on two opposite sides shown in the figures, or end surfaces on more sides (for example, end surfaces on three sides or end surfaces on four sides)) of the display panel have a similar structure in which the first bent portion and the second bent portion overlap, to achieve effects of fastening on multiple sides and preventing light leakage. For example, the first polarizer and the second polarizer may protrude from three sides of the display panel, and are bent oppositely so that bent portions overlap and cover three side surfaces (end surfaces) of the display panel, to achieve effects of fastening on three sides and preventing light leakage. A circuit part (for example, a circuit board and a switch) of the display device may be disposed on the fourth side of the display panel (that is, a side that is not covered because the first polarizer and the second polarizer are not bent).

Compared with the conventional technology, in the display device of the present invention, upper and lower polarizers are bent oppositely and overlap on an end surface on a side of a display panel; in this way, light may be prevented from being leaked from the end surface of the display panel, a black sealant does not need to be used so that a coating process is avoided, a process is simplified, and material costs are reduced. In addition, in the display device of the present invention, the upper and lower polarizers are bent oppositely to fasten the display panel, so that flexibility of a design free of a front frame or even a whole frame is improved, the display panel can expand thermally and is not easily arched and deformed, and reworking feasibility is improved.

The present invention is described by using the foregoing embodiments, but the foregoing embodiments are merely exemplary rather than limitative. A person skilled in the art can make modifications to the described exemplary embodiments without departing from the spirit of the present invention. Therefore, the modifications fall within the scope of the present invention subject to the appended claims.

What is claimed is:

1. A display device, comprising:
a display panel, having:
a first surface;
a second surface, parallel and opposite to the first surface; and
an end surface, connected to the first surface and the second surface;
a first polarizer, disposed on the first surface, and protruding from the first surface and bent to form a first bent portion; and
a second polarizer, disposed on the second surface, and protruding from the second surface and bent to form a second bent portion;
wherein the first bent portion and the second bent portion at least partially overlap over the end surface.

2. The display device according to claim 1, wherein the first bent portion has a first polarization axis direction, the second bent portion has a second polarization axis direction, and the first polarization axis direction is perpendicular to the second polarization axis.

3. The display device according to claim 1, wherein the first polarizer is a clockwise circular polarizer, and the second polarizer is a counter-clockwise circular polarizer.

4. The display device according to claim 1, further comprising a support frame to support the second bent portion, wherein the first bent portion extends beyond the second bent portion to partially cover the support frame.

5. The display device according to claim 4, wherein the first bent portion is connected to the support frame, and the first bent portion receives a greater tension than the second bent portion.

6. The display device according to claim 4, wherein a slot is formed on the support frame, and the first bent portion extends into the slot.

7. The display device according to claim 4, further comprising an outer frame, wherein the outer frame covers the first bent portion where covering the support frame.

8. The display device according to claim 1, wherein the second bent portion is sandwiched between the first bent portion and the end surface, and the second bent portion is bent to partially cover the first surface.

* * * * *